United States Patent

Hobs

[15] 3,667,599

[45] June 6, 1972

[54] CONTINUOUS CORRUGATED BELT WITH WIRE SCREEN

[72] Inventor: Oliver K. Hobs, P. O. Box 1306, Suffolk, Va. 23434

[22] Filed: Dec. 8, 1969

[21] Appl. No.: 882,846

[52] U.S. Cl. ................................209/12, 209/92, 209/255, 209/267, 209/314
[51] Int. Cl. .....................................B03b 7/00, B07b 13/04
[58] Field of Search................209/12, 45, 46, 233, 470, 392, 209/263, 264, 265, 267, 100, 102, 104, 92, 108, 314, 255

[56] References Cited

UNITED STATES PATENTS

| | | | |
|---|---|---|---|
| 275,105 | 4/1883 | Wild | 209/392 |
| 977,478 | 12/1910 | Royer | 209/92 X |
| 1,296,383 | 3/1919 | Grey | 209/267 X |
| 1,675,049 | 6/1928 | Perkins | 209/92 |
| 2,428,852 | 10/1947 | Muir | 209/92 |
| 2,661,575 | 12/1953 | Kennedy | 209/247 X |
| 3,013,660 | 12/1961 | Davies | 209/92 |
| 3,067,855 | 12/1962 | Lambert | 209/267 UX |
| 3,209,911 | 10/1965 | Speno | 209/470 X |

*Primary Examiner*—Frank W. Lutter
*Assistant Examiner*—Robert Halper
*Attorney*—Clelle W. Upchurch

[57] ABSTRACT

An apparatus adapted to separate peanuts from grass, vines, dirt and other waste material combines a sloping rotating continuous belt having recesses therein adapted to trap the waste material and carry it away as the peanuts roll down its sloping surface with baffles or curtains, a barrier or reservoir across the lower end of the belt and screening means to remove substantially all of the material which remains with peanuts after harvesting.

11 Claims, 5 Drawing Figures

PATENTED JUN 6 1972

3,667,599

CONTINUOUS CORRUGATED BELT WITH WIRE SCREEN

This invention relates generally to separators and more particularly to an apparatus particularly advantageous for separating peanuts from other materials such as grass, weeds, dirt and the like.

It has been proposed heretofore to provide an apparatus for separating peanuts from those waste materials which remain therewith after harvesting. None of the heretofore apparatuses have been entirely successful, however, because they cannot rapidly separate all the grass, weeds and the like from the peanuts. An apparatus for separating cracked shells from nut meats is disclosed in U.S. Pat. No. 2,318,976 but such an apparatus will not satisfactorily separate peanuts from all of the grass, etc., remaining with them after harvesting.

It is, therefore, an object of this invention to provide an apparatus for separating a mixture of materials of different particle size and/or configuration. Another object of the invention is to provide an apparatus which is particularly advantageous for separating vines, weeds, dried grass, dirt and other materials from peanuts still in the shell.

Other objects will become apparent to those skilled in the art from the following description with reference to the accompanying drawing in which FIG. 1 is an elevational view, partially in section, of an embodiment of the invention taken along the line 1—1 of FIG. 2;

Figure 1:
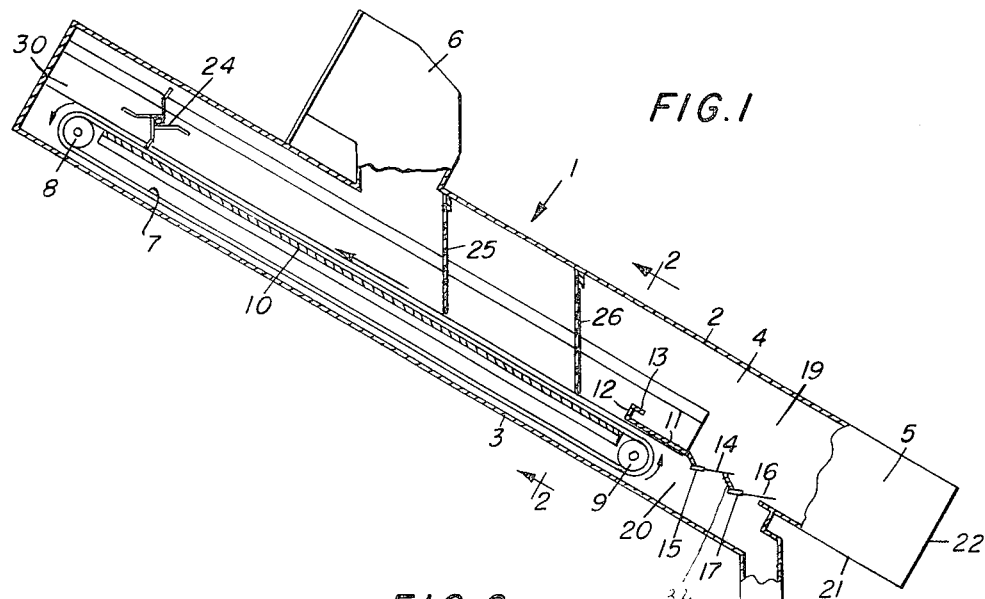

The objects of this invention are accomplished by providing an apparatus for separating various solid materials of different granulation or configuration which is particularly advantageous for cleaning peanuts after harvesting. The apparatus combines a continuous belt having pockets in the surface thereof adapted to entrap grass, particles of peanut shells, dirt and the like but not peanuts which are still in the shell. Additional cleaning is provided by means of baffles or curtains which permit passage of peanuts but not the waste material and by a barrier at the end of the continuous belt. A screen is also provided for removal of any fine material remaining with the peanuts after separation from most of the contaminating material on the continuous belt. Hence, the apparatus combines a rotating inclined continuous belt with a rotor, flexible baffles, a rigid barrier and a screen which remove any material remaining with the peanuts after they have rolled down the inclined surface of the belt.

Referring now to the drawing, an elongated sheet metal enclosure 1 is formed by top panel 2, bottom panel 3 and sidewalls 4 and 5 and is supported by a suitable frame at an angle of about 45° above horizontal. Input duct 6 permits the introduction of material to be separated into enclosure 1. Continuous elliptically shaped rubber belt 7 rotates in a loop-shaped path about longitudinally spaced rollers 8 and 9 journalled at their ends in sidewalls 4 and 5. An electric motor or other suitable source of power is used to rotate one of said rollers 8 or 9 counterclockwise as indicated by the arrows in FIG. 1 and thereby drive belt 7. A plate 10 rigidly secured to sidewalls 4 and 5 supports the upper portion of belt 7 against sagging. Plate 11 of sheet metal, plastic or the like rigidly secured to sidewalls 4 and 5 covers the lower end of belt 7. The upper edge of plate 11 has an upwardly extending flange 12. Preferably, the upper edge of flange 12 is bent over to provide a lip 13.

Figure 5:
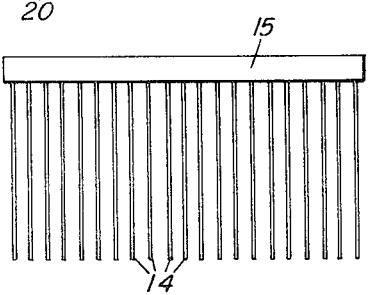
FIG. 5 illustrates a preferred type of screen used in accordance with the invention.

As shown in FIG. 5, a plurality of transversely spaced rigid fingers or wires 14 are secured at their upper ends to a transverse plate 15 in a form resembling an enlarged wire comb. Plate 15 lies under the lower edge of plate 11. Fingers 14 are unsecured at their lower end. A second row of transversely spaced fingers 16 are secured at their upper end to a rigid transverse plate 17. Plates 15 and 17 are bolted to plates 11 and 32. The two sets of fingers 14 and 16 form a screen through which any fine material passing over plate 11 will fall. The upper portion of belt 7 combines with plate 11 and the sets of fingers 14 and 16 to separate enclosure 1 into an upper compartment 19 and lower compartment 20. The lower end of fingers 16 are unsecured and extend over bottom 21 of discharge spout 22.

Spout 23 discharges material from compartment 20. A doffer 24 journalled in sidewalls 4 and 5 rotates at about 1,200 revolutions per minute above belt 7. A flexible rubber curtain 25 is rigidly secured to top panel 2 and hangs downwardly to the upper surface of belt 7. A second curtain 26 spaced longitudinally from curtain 25 is also rigidly secured to top panel 2 and hangs downwardly to a point near the surface of belt 7.

Figure 3:
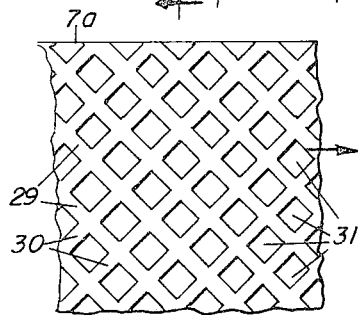
FIG. 3 is a fragmentary plan view of a preferred continuous belt used in the embodiment of FIG. 1.

As shown best in FIG. 3, the exposed surface of belt 7 is corrugated. In the preferred embodiment of FIG. 3 parallelepiped shaped protuberances 27 having a rectangular exposed surface are spaced over the surface of belt 7 to form recesses 28. Alternate transverse rows of protuberances 27 are regularly spaced one after the other in the longitudinal direction. Intermediate transverse rows of protuberances 27 are also regularly spaced one after the other in the longitudinal direction but are displaced transversely so that the protuberances 27 of any one transversely extending row will bridge the space between the protuberances 27 of the two rows adjacent thereto, as shown in FIG. 3.

Figure 4:
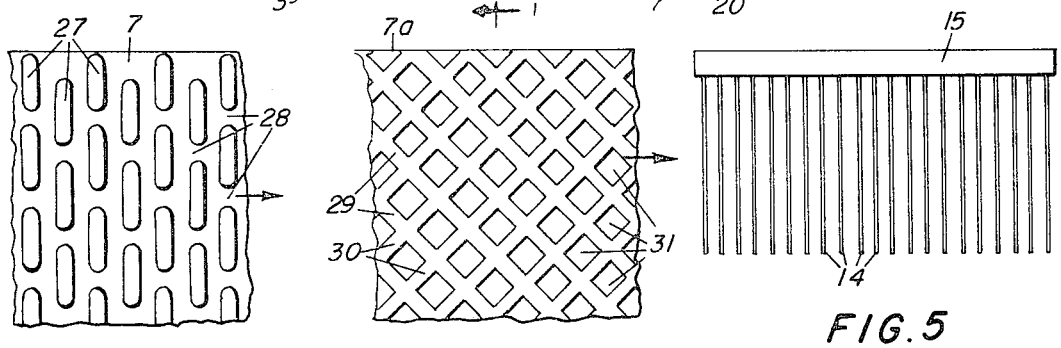
FIG. 4 is a fragmentary plan view of another type of a continuous belt used in an embodiment of the invention.

In another embodiment of the invention shown in FIG. 4, the exposed surface of belt 7A is provided with oblique ridges 30 and 29 which intersect each other to form diamond shaped pockets or cavities 31 therebetween.

The spacing of protuberances 27 and of ridges 28 and 29 are predetermined to provide cavities or recesses over the surface of belt 7 which are smaller than the product to be discharged from spout 22 but of such dimensions that the material to be discharged from spout 23 becomes entrapped therein.

Figure 2:
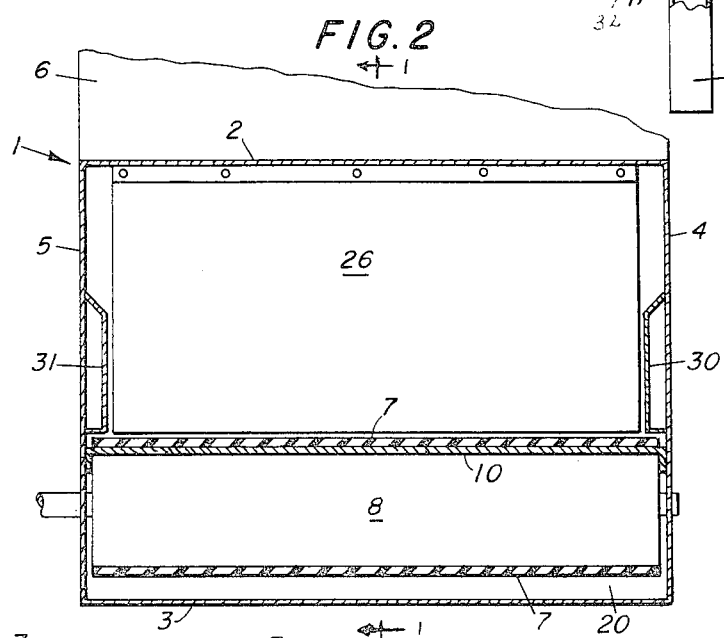
FIG. 2 is a cross-sectional view taken along the line 2—2 of FIG. 1.

As illustrated best in FIG. 2, shields 30 and 31 rigidly secured at top and bottom to sidewalls 4 and 5, respectively, overlap the edges of belt 7 to prevent an accumulation of material. Shields 30 and 31 extend along sidewalls 4 and 5 from just beyond one end of belt 7 to just beyond the other end as shown in FIG. 1. The bottoms of shields 30 and 31 are substantially parallel with belt 7 and are spaced only a short distance therefrom.

In operation, peanuts or other desirable product mixed with waste materials such as dirt, weeds, grass, peanut-shell scrap or the like are introduced over the surface of belt 7 through spout 6 at a point about midway the length of the belt. The upwardly moving belt entraps dirt, grass and other small material in the pockets of its surface while the peanuts are prone to roll down the belt towards spout 22. However, some peanuts may be carried upwardly by material on the surface of the belt. The doffer is rotated at a fast speed creating an air current which tends to blow the peanuts back and prevent them from being carried over the upper end of the belt. The volume of air available to doffer 24 can be regulated by positioning the doffer with only a part of its flaps extending above sideplates 30 and 31 and with its ends fitting closely against the sideplates. In this way, the space between the ends of the rotor and sidewalls 3 and 4 above sideplates 30 and 31 provides most of the air circulated by the doffer. Too much air will result in waste material being blown out of the pockets in the belt. Preferably, doffer 24 is rotated at a speed of from about 800 to about 2,400 revolutions per minute. The material trapped on the corrugated surface of the belt falls off as the belt moves around roller 8. This material slides down through compartment 20 and out through spout 23. Flow of fine granular material and light weight dried grass and the like downwardly over the surface of belt 7 is prevented by curtains 25 and 26. These curtains are thin sheets of flexible rubber or plastic and move under the weight of peanuts. The peanuts roll over the surface of belt 7, over flange 12, plate 11 and fingers 14 and 16 and out of the separator. Any grass or other contaminant which passes curtains 25 and 26 will be stopped by flange 12 or will fall through the openings between fingers 14 and 16. The peanuts are collected from spout 22.

With some materials such as bark mixed with dirt, splinters and sawdust, fingers 14 are not always required. The sawdust and other contaminants are separated sufficiently from belt so the fingers are not used. Preferably, enclosure 1 slopes from about 40° to about 50° above horizontal with an angle of about 44° being best for bark, about 47° for peanuts and about 50° for corn. The belt should preferably move at a speed of from about 600 to about 2,000 feet per minute.

Although the invention has been described in detail for the purpose of illustration, it is to be understood that such detail is solely for that purpose and that variations therein can be made by those skilled in the art without departing from the spirit and scope of the invention except as it is limited by the claims.

I claim:

1. An apparatus for separating materials which comprises an elongated enclosure having a top, bottom and sidewalls, said enclosure sloping upwardly above horizontal and having a lower end and an upper end, a continuous belt adapted to rotate about longitudinally spaced transversely extending rollers journalled in said sidewalls, said belt being substantially parallel with said top and bottom and extending transversely through said enclosure from adjacent one sidewall to adjacent the other sidewall, the upper exposed surface of said belt having a corrugated surface with recesses adapted to receive less than all of said material, a plate extending transversely through said enclosure rigidly secured to each sidewall thereof and covering the lower end of said belt, said plate extending downwardly from said belt towards the lower end of said enclosure, a transverse bar at the point where said plate and belt meet to retard flow of material towards said plate, a screen having its longitudinal axis in substantially the same plane as that of the plate rigidly secured at each end to a sidewall of said enclosure and in engagement with the lower edge of said plate adapted to receive material passing downwardly over the plate, the upper portion of said belt combining with said plate and screen to separate the enclosure into longitudinally extending upper and lower compartments, means for introducing said material to the corrugated surface near the midpoint of the belt, a doffer near the upper end of said belt, spaced curtains secured to said top and dropping to adjacent said belt, one of said curtains being just below where said material is fed on said belt, means for rotating said belt toward the upper end of the enclosure, means for discharging material from the lower compartment and means for discharging material from said upper compartment.

2. The apparatus of claim 1 wherein a pair of shields extending inwardly from the said sidewalls overlap the edges of said belt.

3. The apparatus of claim 2 wherein said screen is composed of a plurality of rows of transversely spaced longitudinally extending fingers rigidly secured at the upper ends and unsecured at the lower ends thereof.

4. The apparatus of claim 3 wherein the exposed surface of said belt has alternate rows of transversely spaced parallelopiped shaped protuberances aligned longitudinally and combined with intermediate rows of also transversely spaced parallelopiped shaped protuberances, the protuberances of one row bridging the spaces between the protuberances of each row adjacent thereto.

5. The apparatus of claim 4 wherein said enclosure is sloped about 45° above horizontal.

6. The apparatus of claim 4 wherein said doffer is a rotor having outwardly extending flaps which terminate near the exposed surface of said belt.

7. The apparatus of claim 6 wherein said belt is supported against sagging under the weight of material thereon.

8. The apparatus of claim 4 wherein the pockets between said protuberances reject peanuts and accept waste mixed therewith.

9. The apparatus of claim 4 wherein the exposed surface of said belt has spaced oblique ridges extending thereacross extending between the edges of the belt in opposite directions and intersecting to form diamond shaped pockets therebetween.

10. The apparatus of claim 9 wherein said curtains are flexible rubber sheets.

11. In an apparatus adapted to separate peanuts from waste materials remaining after harvesting having a sloping continuous belt with a corrugated exposed surface which will entrap the waste but not the peanuts and means for discharging said peanuts from said apparatus, a screen intermediate said belt and discharge means over which said peanuts pass after rolling over said belt which comprises a row of spaced longitudinally extending wires rigidly secured at that end nearest said belt but unsecured at the opposite end thereof, said row of wires being at least as wide as said belt whereby all peanuts pass thereover before discharge from said apparatus.

* * * * *